United States Patent
Ramzan et al.

(10) Patent No.: US 10,803,372 B2
(45) Date of Patent: Oct. 13, 2020

(54) MULTI-CONFIGURATION LABEL

(71) Applicant: SML BRAND IDENTIFICATION SOLUTIONS LIMITED, Kwun Tong (HK)

(72) Inventors: Mohammed Ramzan, Halifax (GB); Daniel Smith, Melton Mowbray (GB)

( * ) Notice: Subject to any disclaimer, the term of this patent is extended or adjusted under 35 U.S.C. 154(b) by 0 days.

(21) Appl. No.: 16/615,451

(22) PCT Filed: May 24, 2018

(86) PCT No.: PCT/IB2018/053694
§ 371 (c)(1),
(2) Date: Nov. 21, 2019

(87) PCT Pub. No.: WO2018/215968
PCT Pub. Date: Nov. 29, 2018

(65) Prior Publication Data
US 2020/0175347 A1    Jun. 4, 2020

(30) Foreign Application Priority Data
May 24, 2017   (EP) ...................... 17172829

(51) Int. Cl.
*G08B 13/14* (2006.01)
*G06K 19/077* (2006.01)
*G06K 19/08* (2006.01)

(52) U.S. Cl.
CPC ... *G06K 19/07718* (2013.01); *G06K 19/0776* (2013.01); *G06K 19/07771* (2013.01); *G06K 19/08* (2013.01)

(58) Field of Classification Search
CPC ............. G06K 19/07718; G06K 19/08; G06K 19/07771; G06K 19/0776;
(Continued)

(56) References Cited

U.S. PATENT DOCUMENTS 7,119,684 B2 * 10/2006 Petersen .................. B65D 5/42
340/568.1
2006/0092027 A1    5/2006 Ito
(Continued)

FOREIGN PATENT DOCUMENTS

CN    103617763 A    3/2014

OTHER PUBLICATIONS

International Search Report with Written Opinion, dated Aug. 29, 2018, received in international patent application No. PCT/IB2018/053694, 7 pages.

*Primary Examiner* — Anh V La
(74) *Attorney, Agent, or Firm* — Verrill Dana, LLP; John W. Powell (57) ABSTRACT

A label, comprising first base segment (16) having an adhesive for affixing it to a surface of an object and a second base segment (18) having an adhesive for affixing it to the surface. There is a label segment (32), spaced in an orthogonal direction from the base segment, comprising a radio frequency identification (RFID) device and/or indicia. There is a first leg segment (22) In interconnecting the first base segment (16) to a first portion of the label segment (32) and second leg segment (28) interconnecting the second base segment (18) to a second portion of the label segment (32). The first leg segment (22) interconnects with the first base segment (16) at an angle, which is not ninety degrees relative to the first base segment (16) and wherein the second leg segment (28) interconnects with the second base segment (18) at an angle, which is not ninety degrees relative to the second base segment (18).

25 Claims, 7 Drawing Sheets

(58) Field of Classification Search
CPC ....... G06K 19/07749; G06K 19/07758; H04B 5/02; B65D 23/14; B65D 25/205; G09F 3/0289; G09F 3/00; G09F 3/10; G09F 2003/0272; B42D 3/18
USPC .............. 340/572.1, 572.8, 568.1, 571, 10.1; 235/492, 493, 487, 380, 383
See application file for complete search history.

(56) References Cited

U.S. PATENT DOCUMENTS

| | | |
|---|---|---|
| 2007/0145150 A1 | 6/2007 | Barczyk et al. |
| 2008/0055089 A1* | 3/2008 | Gustafsson ...... G06K 19/07749 340/572.1 |
| 2009/0045964 A1* | 2/2009 | Takeda ............. G06K 19/07749 340/572.9 |
| 2011/0253792 A1* | 10/2011 | Tuttle ............... G06K 19/07749 235/492 |
| 2015/0021223 A1* | 1/2015 | Raistrick ................ B65D 23/14 206/459.5 |
| 2015/0154489 A1 | 6/2015 | Dancausse et al. |

* cited by examiner

TAKE THE CENTRE 2 SEGMENTS

FIG. 6A

FOLD INTO A TICKET

FIG. 6B

APPLY TO A PRODUCT

MULTI-CONFIGURATION LABEL

CROSS-REFERENCE TO RELATED APPLICATION

This application is the United States National Stage of International Application Number PCT/I132018/053694, filed May 24, 2018, which claims the benefit of priority to European Application No. 17172829.8, filed May 24, 2017. The contents of both applications are hereby incorporated by reference in their entirety.

FIELD OF INVENTION

The present invention generally relates to a label for applying to an item and more particularly to such a label containing an RFID device and/or indicia, such as a bar code, and to such a label that may be constructed from a planar label into a plurality of three-dimensional label configurations.

BACKGROUND

Businesses have a need to identify individual products and to track them throughout the supply chain from production to point-of-sale. This can be done using labels with certain indicia, such as a bar code, or other written information about the labelled product.

Radio Frequency Identification (RFID) is a technology that is also used in these label applications. RFID uses radio waves for communication between the label and a reading device. The label usually consists of a microchip attached to an antenna. The reader (or interrogator) is capable of reading data from and writing data to the label. The RFID device is a tiny microchip encapsulated in plastic, paper or similar material, forming a part of the label, which may be fixed to the product or its packaging.

When the label contains a RFID device, the product to be labelled may contain or be made of materials which may affect the proper operation of the RFID device, such as metals, liquids containing minerals and the like. Thus, the label must be spaced appropriately from the product to allow for proper operation. Special labels have been constructed for this purpose but they are somewhat complex and expensive. Moreover, in a typical business operation, only certain products to be labeled will require such special labels, while other products using RFID may only need simpler labels, which do not provide the spacing provided with the RFID labels described above.

Moreover, with a variety of different products, different types of labeling will be required. For example, certain products may be applied on large flat surfaces of the product, such as products contained in boxes and other products may need to be applied to an edge of a product package, in a stand-off fashion, so that the labels are accessible when the products are arranged in a stack. Further, some labels may need to be affixed to a product using a tie to connect the label to a portion of the product.

The current solution for business having to label a number of different product types requiring different label types, a variety of different labels must be purchased in smaller quantities, which results in higher costs and more complexity for the workers applying the various labels. US 2009/0045964 A1 relates to a RFID-tag structure body, RFID label, and apparatus for producing RFID labels. EP1,921,570 A2 relates to a radio frequency integrated circuit tag and method of using the RFIC/RFID tag. EP 1 803 086 A0 relates to a method for applying a RFID tag carrying label on an object.

SUMMARY

It is therefore an object of this invention is to provide a single label that may include an RFID inlay and that may be configured into multiple label configurations to be used with a variety of products having different labeling requirements. The invention is defined by the appended claims.

In one aspect, the disclosure features a label, comprising a first base segment having a bottom surface comprising an adhesive for affixing the first base segment to a surface of an object and having a top surface opposite the bottom surface. There is a second base segment, having a bottom surface comprising an adhesive for affixing the second base segment to the surface of the object and having a top surface opposite the bottom surface. There is also a label segment comprising at least one of a first portion of a radio frequency identification (RFID) device and indicia, the label segment being spaced from the top surfaces of the first and second base segments in a direction substantially orthogonal to the top surfaces of the first and second base segments. In addition, there is a first leg segment interconnecting the first base segment to a first portion of the label segment and a second leg segment interconnecting the second base segment to a second portion of the label segment. The first leg segment interconnects with the first base segment at an angle, which is not ninety degrees relative to the top surface of the first base segment and wherein the second leg segment interconnects with the second base segment at an angle, which is not ninety degrees relative to the top surface of the second base segment.

In other aspects of the disclosure, one or more of the following features may be included. The label segment may comprise a top surface and a bottom surface and the bottom surface of the label segment faces the top surfaces of the first and second base segments. The label segment may be comprised of two label sub-segments each having a bottom surface with an adhesive and a top surface, the two label-sub-segments being folded upon each other such that the bottom surfaces of the label sub-segments are adhered to each other to form the label segment, wherein the top surface of one of the label sub-segments forms the top surface of the label segment and the top surface of the other of the label sub-segments forms the bottom surface of the label segment. The label segment may include the portion of the RFID device disposed on one of the bottom surfaces of the label sub-segments and is sandwiched between the bottom surfaces of the label sub-segments when the two label-sub-segments are folded upon each other. The label segment may include the indicia and the indicia comprises one of a bar code label or other written information about the object. The first portion of the RFID device of the label segment may constitute the entire RFID device. There may further be included a second portion of the RFID device located on one of the first or second leg segments and interconnected to the first portion of the RFID device. There may be included a third portion of the RFID device located on one of the first or second base segments and interconnected to the second portion of the RFID device. The first leg segment may interconnect with the first base segment at an acute angle relative to the top surface of the first base segment and wherein the second leg segment may interconnect with the second base segment at an acute angle relative to the top surface of the secand base segment. The first leg segment may interconnect with the first base segment at an obtuse angle relative to the top surface of the first base segment and wherein the second leg segment may interconnect with the second base segment at an obtuse angle relative to the top surface of the second base segment. The base segments, the leg segments and the label segment may be rectangular. The base segments and the leg segments may be substantially the same size. The label segment may be larger than either the base segments or the leg segments.

In another aspect, the disclosure features a label, comprising a planar sheet including a plurality of segments separated by perforations, the planar sheet being affixed to a release liner. The plurality of segments comprises a first base segment having a bottom surface including an adhesive for affixing the first base segment to a surface of an object and having a top surface opposite the bottom surface and a second base segment, having a bottom surface including an adhesive for affixing the second base segment to the surface of the object and having a top surface opposite the bottom surface. There is a label segment including at least one of a radio frequency identification (RFID) device and indicia, a first leg segment and a second leg segment. The plurality of segments are configured to be folded into at least a first three dimensional label, wherein with the first three dimensional label the label segment is spaced from the top surfaces of the first and second base segments in a direction substantially orthogonal to the top surfaces of the first and second base segments. The first leg segment interconnects the first base segment to a first portion of the label segment and the second leg segment interconnects the second base segment to a second portion of the label segment. The first and second leg segments interconnect with the first and second base segments, respectively, at angles, which are not at ninety degrees relative to the top surfaces of the first and second base segments.

In yet other aspects of the disclosure, one or more of the following features may be included. The label segment may comprise a top surface and a bottom surface and the bottom surface of the label segment faces the top surfaces of the first and second base segments. The label segment may be comprised of two label sub-segments each having a bottom surface with an adhesive and a top surface, the two label-sub-segments being folded upon each other such that the bottom surfaces of the label sub-segments are adhered to each other to form the label segment, wherein the top surface of one of the label sub-segments forms the top surface of the label segment and the top surface of the other of the label sub-segments forms the bottom surface of the label segment. The label segment may include the portion of the RFID device disposed on one of the bottom surfaces of the label sub-segments and is sandwiched between the bottom surfaces of the label sub-segments when the two label-sub-segments are folded upon each other. The label segment may include the indicia and the indicia comprises one of a bar code label or other written information about the object. The first portion of the RFID device of the label segment may constitute the entire RFID device. There may further be included a second portion of the RFID device located on one of the first or second leg segments and interconnected to the first portion of the RFID device. And, there may also be included a third portion of the RFID device located on one of the first or second base segment and interconnected to the second portion of the RFID device. The first leg segment may interconnect with the first base segment at an acute angle relative to the top surface of the first base segment and wherein the second leg segment may interconnect with the second base segment at an acute angle relative to the top surface of the second base segment. The first leg segment may interconnect with the first base segment at an obtuse angle relative to the top surface of the first base segment and wherein the second leg segment may interconnect with the second base segment at an obtuse angle relative to the top surface of the second base segment. The base segments, the leg segments and the label segment may be rectangular. The base segments and the leg segments may be substantially the same size and the label segment may be larger than either the base segments or the leg segments.

In yet further aspects of the disclosure one or more of the following features may be included. The plurality of segments may be configured to be alternatively folded into a second three dimensional label, wherein the second three dimensional label comprises only the label segment and wherein the label segment comprises two label sub-segments each having a bottom surface with an adhesive and a top surface, the two label-sub-segments being folded upon each other such along a perforation such that the bottom surfaces of the label sub-segments are adhered to each other to form the label segment. The two label-sub-segments may be folded upon each other along the perforation such that the bottom surfaces of the label sub-segments are adhered to each other and at an end spaced from the perforation the bottom surfaces of the label sub-segments are adhered to an object. The label segment may further comprise at least one aperture for accepting a tie to affix the label segment to an object.

DETAILED DESCRIPTION

To assist understanding of the disclosure, a preferred embodiment of the multiconfiguration product label will be described in detail below.

Figure 1:
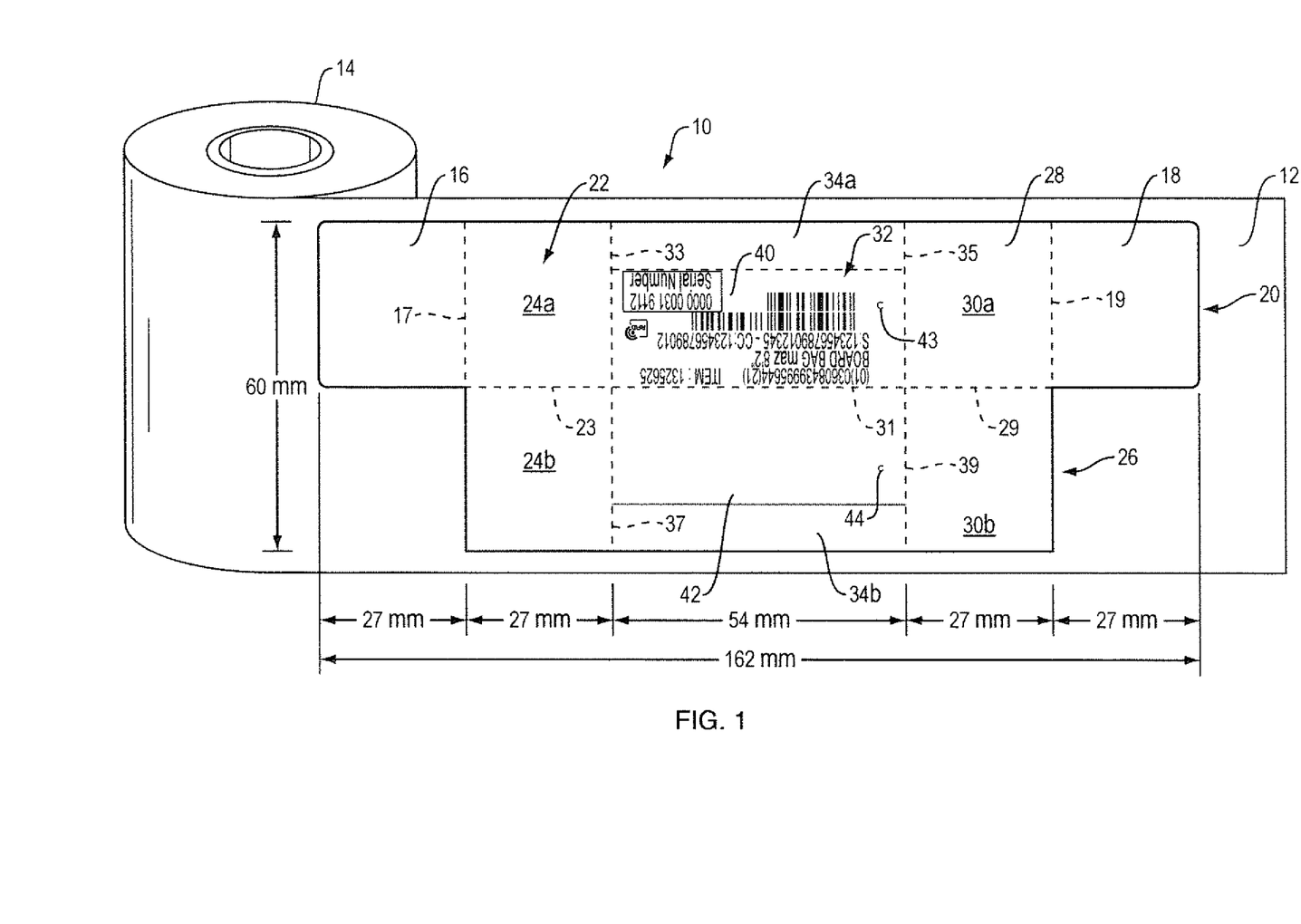
FIG. 1 is a perspective view of roll of the multi-configuration labels in planar form according to the invention.
Figure 2A:
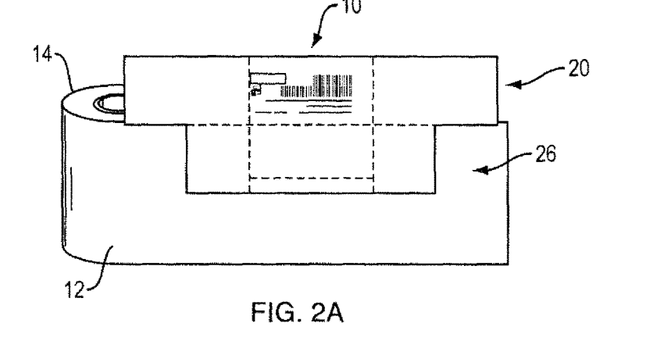
FIGS. 2A-D are perspective views of a label of FIG. 1 configured into one of the multiple possible configurations applied to a product with a metal surface.
Figure 2B:
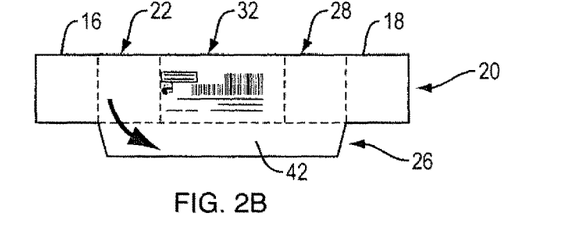
Figure 2C:
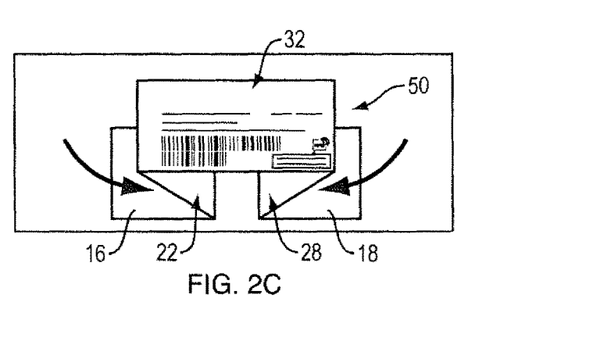
Figure 2D:
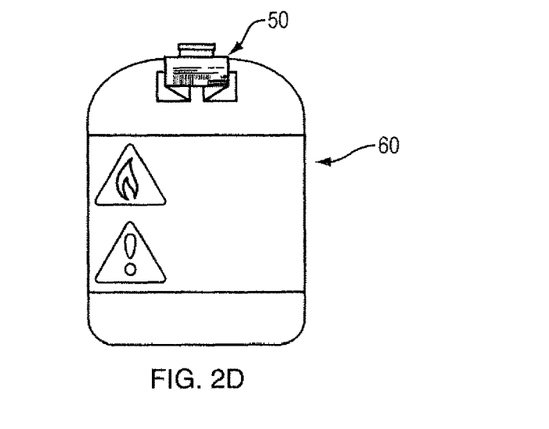

An improved label 10, according to this invention, is depicted in FIG. 1 as a planar sheet adhered to a length of release liner 12 with an adhesive affixed to the bottom surface of label 10. A length of release liner 12 with a plurality of labels affixed to it along its length form label roll 14. Label roll 14 may include hundreds or even thousands of labels. The individual label 10 in planar form may be removed from the release liner and constructed into one of multiple possible three dimensional label configurations, as described below. By providing the option of constructing multiple three-dimensional label configurations from a single label roll 14, the user is provided with a very versatile product that can be used to label a multitude of different products/objects in various ways.

Label 10 includes a plurality of segments separated by perforations along which folds may be made or segments separated to form the different label configurations. On opposite ends of label 10 are first base segment 16 and second base segment 18, which are part of top portion 20 of label 10. First leg segment 22 comprises leg sub-segment 24a which is adjacent to first base segment 16 along top portion 20 and separated by perforation 17 running across the width of label 10 and leg sub-segment 24b, which is part of bottom portion 26 of label 10. Leg sub-segments 24a, b are separated by perforation 23 running along the length of label 10. Second leg segment 28 comprises leg sub-segment 30a which is adjacent to second base segment 18 along top portion 20 and separated by perforation 19 running across the width of label 10 and leg sub-segment 30b, which is part of bottom portion 26 of label 10. Leg sub-segments 30a,b are separated by perforation 29 running along the length of label 10.

Label segment 32 comprises label sub-segment 34a which is positioned between leg sub-segment 24a of first leg segment 22 and leg sub-segment 30a of second leg segment 28 on top portion 20 of label 10. Label sub-segment 34b is positioned between leg sub-segment 24b of first leg segment 22 and leg sub-segment 30b of second leg segment 28 on bottom portion 26 of label 10. Label sub-segments 34a and 34b are separated by perforation 31 running along the length of label 10 and form a part of the divider (along with perforations 23 and 29) between top portion 20 and bottom portion 26 of label 10. Perforation 33 separates label sub-segment 34a from leg sub-segment 24a and perforation 35 separates label sub-segment 34a from leg sub-segment 30a. With regard to label sub-segment 34b, perforation 37 separates it from leg sub-segment 24b and perforation 39 separates it from leg sub-segment 30b.

On the top surface of label sub-segment 34a is printed indicia, such as a bar code and/or other written information, which may be used to identify the label and ultimately the object/product on which label 10 is applied. In addition, there is shown a RFID circuit 42 on label sub-segment 34b. In this embodiment, RFID circuit 42 is printed on the bottom (adhesive) surface of label sub-segment 34b, so that when assembled (as described below) RFID circuit 42 is sandwiched between bottom surfaces of label sub-segments 34a and 34b when they are folded upon each other along perforation 31 and adhered to each other. The RFID circuit 42 may be read by an RFID reader to obtain identification information regarding the label and ultimately the object/product on which the label is affixed, which information is stored in memory in the RFID circuit 42.

Circular perforations 43 and 44 are included on label sub-segments 34a and 34b, respectively, for use in one of the three-dimensional label configurations noted above. When the sub-segments 34a and 34b are folded upon each other along perforation 31 and adhered to each other, the perforations 43 and 44 align and when removed the label portion within the perforated circles may be removed leaving an aperture through which a tie may be threaded to affix the label to an object. This label configuration is described below.

Referring again to FIG. 1, dimensions of label 10 are depicted to provide scale and to depict the relative dimensions; however, they are only exemplary and any suitable dimensions may be utilized for the particular application desired. In this example, the overall dimension of label 10 are 162 millimeters in length and 60 millimeters in width. Along the length of label 10 the base segments, and leg sub-segments (16, 18, 24a, 24b, 30a, and 30b) are 27 millimeters and across the width of label 10 they are each 30 millimeters. Along the length of label 10 the label sub-segments (34a, 34b) are 54 millimeters, twice that of the other segments/sub-segments. The label sub-segments are each 30 millimeters across the width of label 10, the same as the other segments/sub-segments.

Figure 3:
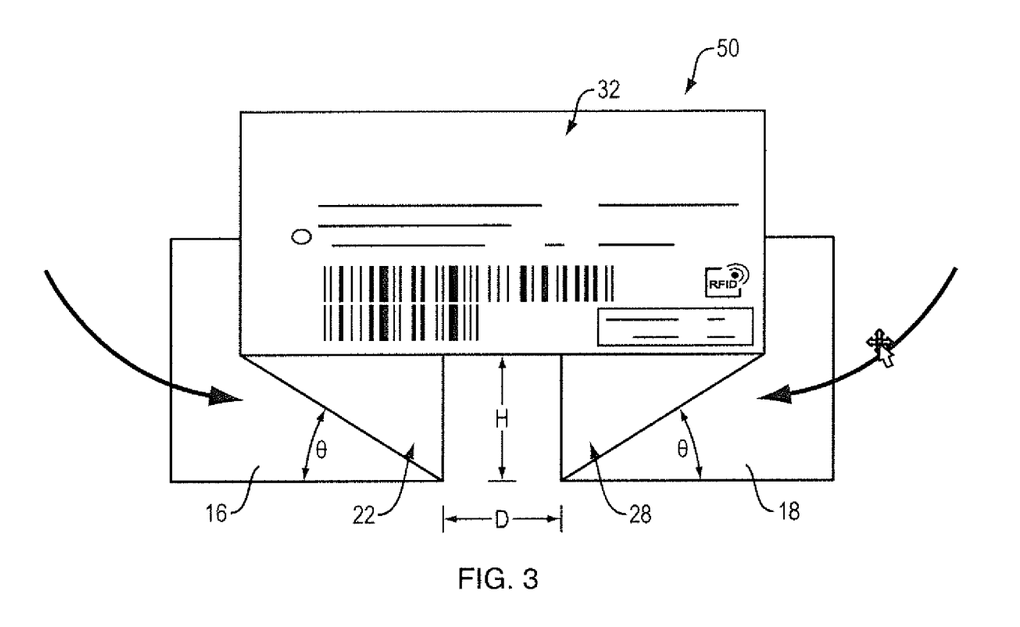
FIG. 3 is an enlarged perspective view of the label configuration depicted in FIG. 2.

As noted above, the plurality of segments of planar label 10 may be configured into several different three-dimensional label configurations, one such configuration, label 50, is shown in FIGS. 2 and 3. Label 50 is disposed on metal container 60, which may be a propane tank or any other product having a metal surface. The operation of RFID circuit 42 may be negatively affected if it is located in too close proximity to a metal surface, such as the surface of metal container 60. Thus, label 50 provides clearance of a distance, H, between the RFID circuit 42 in label segment 32 and the surface of container 60. In this example, with the dimensions provided above, the distance H is less than 27 millimeters, which is the length of the leg segments 22 and 28 since the leg segments are not at right angles relative the surface of metal container 60. A clearance of just less than 27 millimeters to approximately 5 millimeters is generally sufficient to allow for proper operation of the RFID circuit 42; however, it could be greater or less depending on the application and the RFID circuit being used Referring to FIGS. 2A-D, the construction of label 50 will be described. FIG. 2A depicts label 10 removed from release liner 12 of label roll 14. In FIG. 2B, bottom portion 26 of label 10 is folded down along perforations 23, 29, and 30 and its back surface is adhered to the back surface of top portion 20, thus forming leg segments 22 and 28 from the combination of leg sub-segments 24a/24b and leg sub-segments 30a/30b, respectively, when they are adhered together. Label segment 32 is formed from the combination of label sub-segments 34a/34b when they are adhered together. In FIG. 2C, leg segments 22 and 28 are folded up along perforations 17 and 19 and each end of label segment 32 is folded down along perforations 33 and 35 relative to leg segments 16 and 18, respectively. This causes label segment 32 to rise above base segments 16 and 18 forming label configuration 50, which may be adhered to metal container 60, as shown in FIG. 2D, by applying the base segments 16 and 18 to the surface of metal container 60.

As depicted more clearly in FIG. 3, label 50 may be adhered to a surface with a spacing, D, between base segments 16 and 18 at a distance less than the length of the label segment 32, so that leg segments 22 and 28 are not disposed at right angles relative to base segments 16 and 18, respectively, but rather are disposed at acute angles, $\Theta$. As the distance D decreases angles, $\Theta$, decrease as does the height, H, which is the spacing of the label segment from the surface of the container 60. Although not shown, it is possible to increase spacing, D, to be greater than the length of label 32 which results in angles, $\Theta$, being obtuse and the height H being less than the length of leg segments 22 and 28. There is a limit to the spacing of the base segments, as there is a height H at which the metal container 60 will interfere with the operation of RFID circuit 42. Such a height H required will depend on the type of RFID circuit and the type of metal surface to which the label is applied.

It is preferred to not have angles, $\Theta$, be set at right angles because when the angles are either acute or obtuse the structure of label 50 is better able to absorb compression and remain adhered to a surface as it more easily allows movement in the height, H, direction. This is an important feature given the demanding environments the labels on objects/products are exposed to as they are stored in and moved around warehouses and stores and during transportation.

Figure 4A:
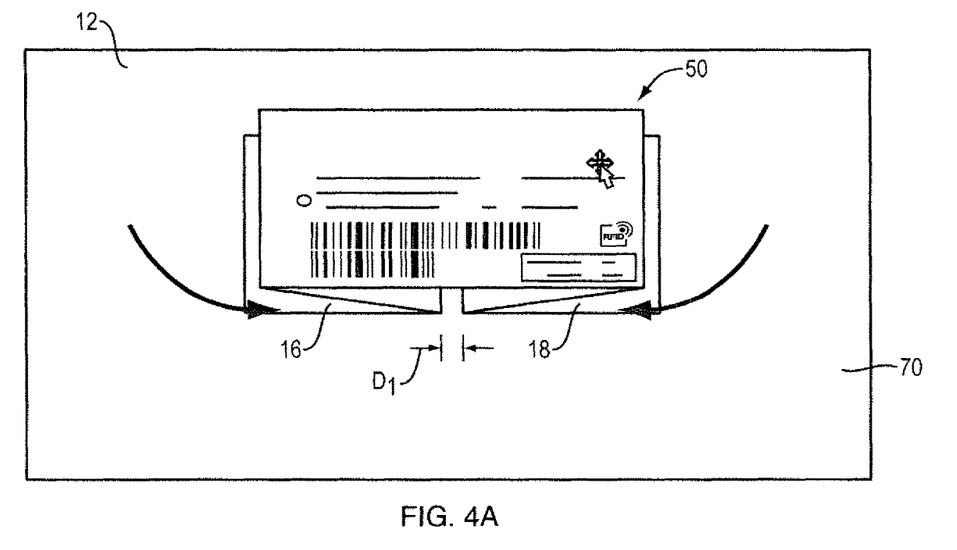
FIGS. 4A-B are perspective views of the label configuration of FIG. 2 applied to an elastic material.
Figure 4B:
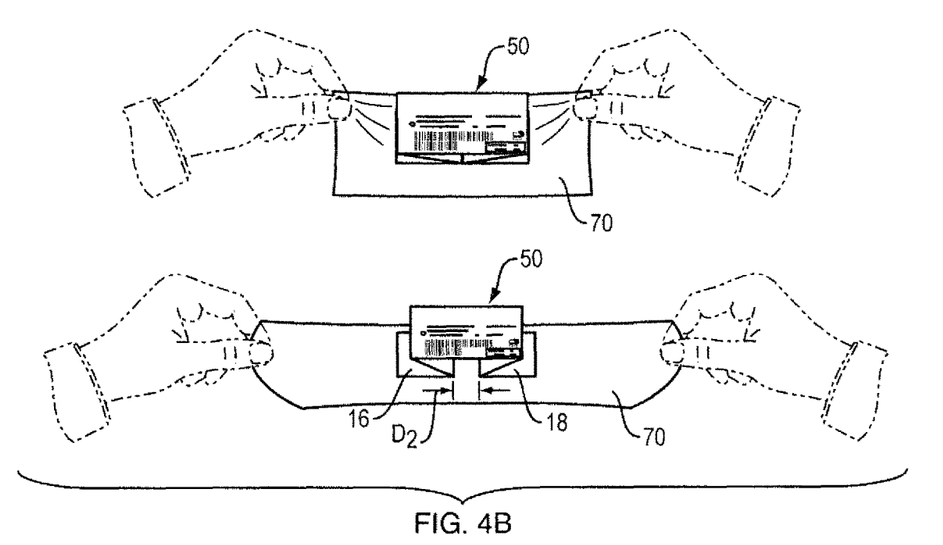

The construction of label 50 may also be beneficial to use in another application, as shown in FIGS. 4A-B. Here label 50 is applied to an elastic surface 70, such as an article of clothing that is stretchable. Since the article is not metallic, spacing from the surface is not required for the performance of the RFID circuit 42. However, another benefit is provided by the same label. In FIG. 4A, plastic surface 70 is at rest and the spacing, $D_1$, between base segments 16 and 18 is the same as when the label was applied to article 70. In the FIG. 4B, the plastic material is stretched, as may be the case when such an article is handled, and it can be seen that base segments 16 and 18 are moved outwardly in the direction of stretching causing the spacing between the segments to increase to a distance $D_2$. The label 50 is able to remain adhered to the plastic as the base segments are allowed to move/float given the angled leg segments 22 and 28. The angles, $\Theta$, between the leg segments and base segments simply increase allowing the base segments to travel without stressing the adhesive connection between the base segments and the plastic surface.

Figure 5A:
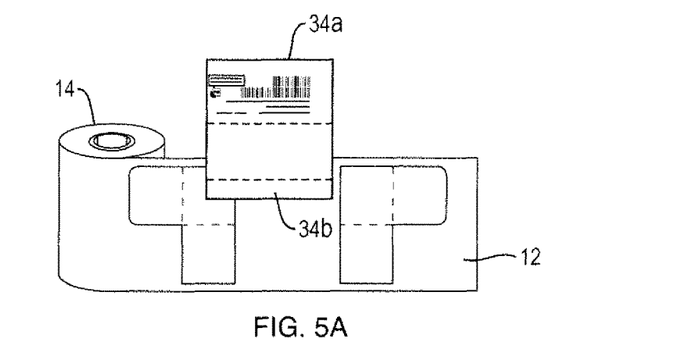
FIGS. 5A-C are perspective views of the label of FIG. 1 configured into a second configuration applied to a product package containing a metal product and to a product with a metal package.
Figure 5B:
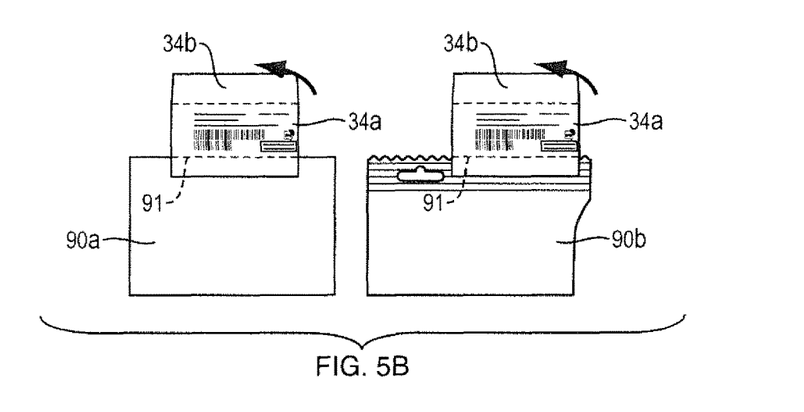
Figure 5C:
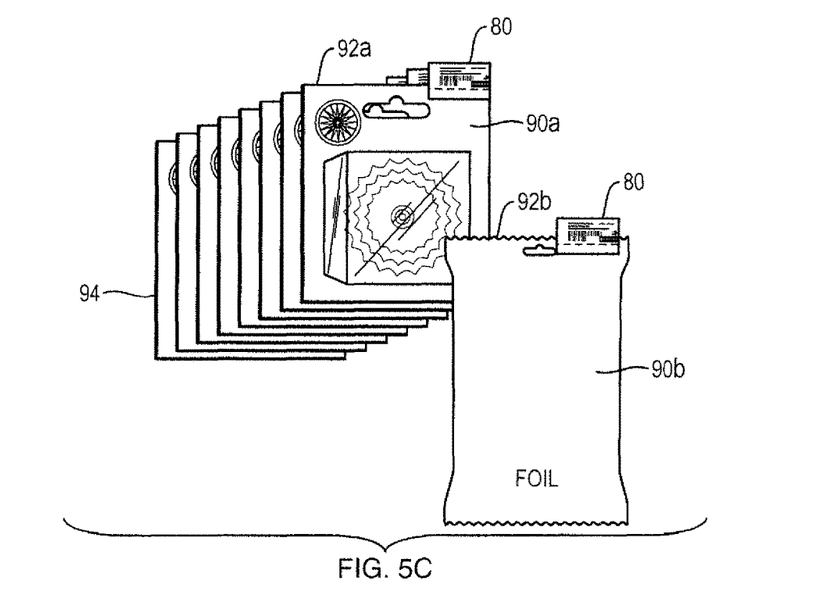

To demonstrate the further versatility of label 10, FIG. 1, an additional three-dimensional configuration, label 80, FIGS. 5A-C, may be constructed and applied to packaging containing a metal object, such as packaging 90a or to metallic packaging, such as foil packaging 90b. In both cases some spacing of the RFID circuit 42 is needed from the packaging and the label needs to applied to a thin top edge of the packaging, i.e. edges 92a,b. By aligning perforation 91 with the top edge of the packaging 90a/90b, this ensures sufficient spacing between RFID circuit 42 and metal. With this type of product, which is typically stored in a vertically stacked arrangement 94, placing the label on the large surface of the product would not be practical as access would not be possible without having to pull the individual packages from the stack 94.

Instead of using the entire label 10, only the middle section comprising label sub-segments 34a and 34b are removed from release liner 12. Label sub-segment 34b may be adhered to the top front side of packages 90a and 90b and then label sub-segment 34a may be folded over along perforation 31 and adhered to the top, backside of packages 90a and 90b. The label sub-segments are also adhered together to form label 80 affixed to the packaging. This label provides easy access for a bar code reader, an RFID reader, or for an individual to read indicia on the label without having to remove them from the stack 94.

Figure 6A:
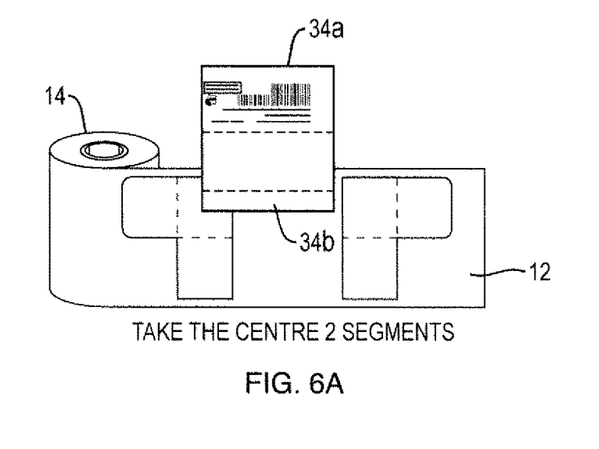
FIGS. 6A-C are perspective views of the label of FIG. 1 configured into a third configuration applied to two different metal products using a tie.
Figure 6B:
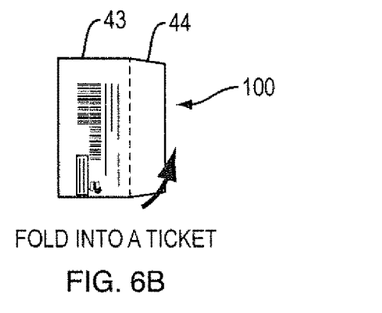
Figure 6C:
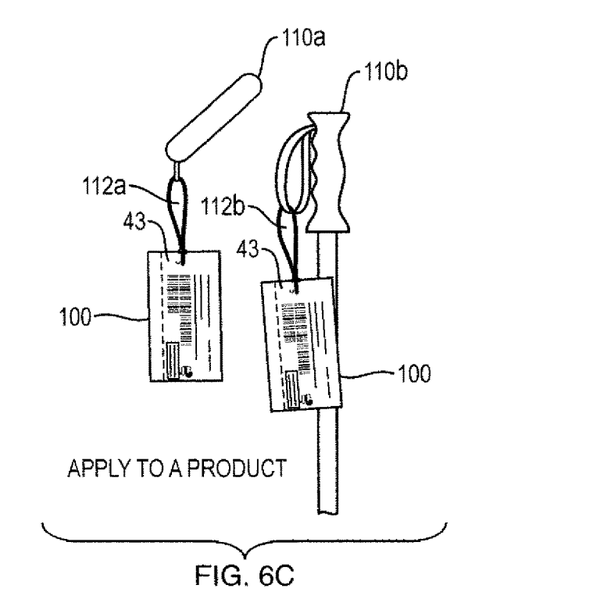

In yet an additional application, label 10, FIG. 1, may be constructed to form another three-dimensional configuration, label 100, FIGS. 6A-C. As with the configuration in FIG. 5, in this configuration only the middle section comprising label sub-segments 34a and 34b are removed from release liner 12. Label sub-segment 34b may be folded over along perforation 31 and adhered to the backside of label sub-segment 34a. Instead of using an adhesive to attach label 100 to an object, circular perforations 43 and 44 are removed, leaving an aperture through which a tie such as ties 112a and 112b are threaded and affixed to products, such as a pocketknife 110a or a ski pole 110b. With this type of product, neither label 50 nor label 80 would work particularly well.

Figure 7:
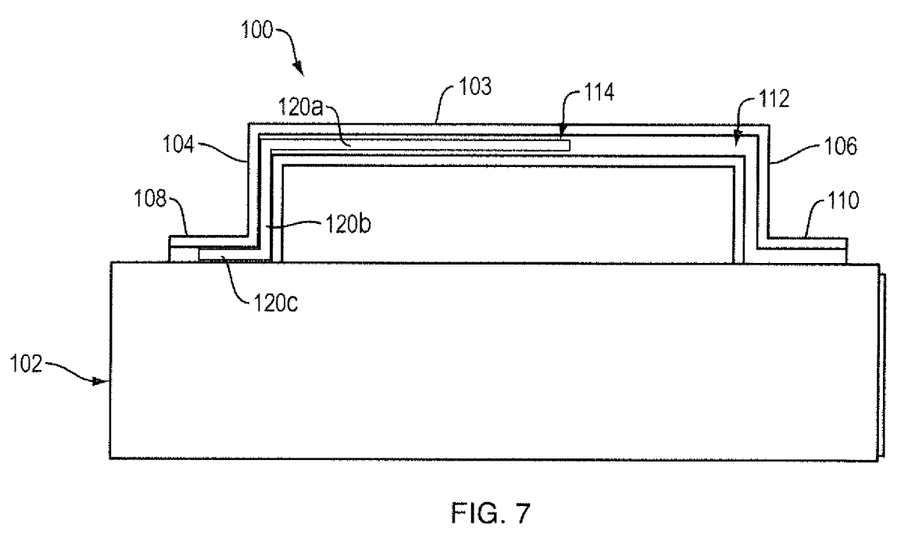
FIG. 7 is a cross-sectional view of another embodiment of the label configuration depicted in FIG. 2 mounted on a metal surface.

It should be noted that while the RFID circuit and the indicia have been described as being on the label segment only, it is possible to locate either or both the RFID circuit or the indicia on any of the other segments of the labels and it is quite possible to have either one or both of the RFID circuit span across two or more segments. Referring to FIG. 7, label 100 is shown to be mounted on metal surface 102. Label 100 includes label segment 103 interconnected to leg segments 104 and 106, which in turn are interconnected, respectively, to base segments 108 and 110. Base segments 108 and 110 are adhered to metal surface 102 by adhesive 112. In this embodiment, RFID circuit 114 comprises a first portion 120a, disposed in label segment 103, a second portion 120b, disposed in leg segment 104, and a third portion 120c, disposed in base segment 108. It should be noted that RFID circuit 114 could alternatively be disposed in the other leg segment 106 and base segment 110. Alternatively, it could be disposed in the label segment and terminate in either of the leg segments instead of terminating in the base segments. When a portion of the RFID circuit is included in base segment the metallic object to which the label is affixed acts as an antenna and couples energy into the RFID circuit.

Having described the invention, and a preferred embodiment thereof, what is claimed as new, and secured by Letters Patent is:

1. A label, comprising:
   a first base segment having a bottom surface comprising an adhesive for affixing the first base segment to a surface of an object and having a top surface opposite the bottom surface;
   a second base segment, having a bottom surface comprising an adhesive for affixing the second base segment to the surface of the object and having a top surface opposite the bottom surface;
   a label segment comprising at least one of a first portion of a radio frequency identification, RFID, device and indicia, the label segment being spaced from the top surfaces of the first and second base segments in a direction substantially orthogonal to the top surfaces of the first and second base segments;
   a first leg segment interconnecting the first base segment to a first portion of the label segment; and
   a second leg segment interconnecting the second base segment to a second portion of the label segment; and
   wherein a distance (D) between a first interconnection of the first base segment with the first leg segment and a second interconnection of the second base segment with the second leg segment is smaller than a length (L) of the label segment so that the first base segment interconnects with the first leg segment at an acute angle relative to the top surface of the first base segment and so that the second base segment interconnects with the second leg segment at an acute angle relative to the top surface of the second base segment.

2. The label of claim 1 wherein the label segment comprises a top surface and a bottom surface and the bottom surface of the label segment faces the top surfaces of the first and second base segment.

3. The label of claim 2 wherein the label segment is comprised of two label sub-segments each having a bottom surface with an adhesive and a top surface, the two label-sub-segments being folded upon each other such that the bottom surfaces of the label sub-segments are adhered to each other to form the label segment, wherein the top surface of one of the label sub-segments forms the top surface of the label segment and the top surface of the other of the label sub-segments forms the bottom surface of the label segment.

4. The label of claim 3 wherein the label segment includes the first portion of the RFID device disposed on one of the bottom surfaces of the label sub-segments and is sandwiched between the bottom surfaces of the label sub-segments when the two label-sub-segments are folded upon each other.

5. The label of claim 4 wherein the label segment includes the indicia and the indicia comprises one of a bar code label or other written information about the object.

6. The label of claim 4 wherein the first portion of the RFID device of the label segment constitutes the entire RFID device.

7. The label of claim 4 further including a second portion of the RFID device located on one of the first or second leg segment and interconnected to the first portion of the RFID device.

8. The label of claim 7 further including a third portion of the RFID device located on one of the first or second base segment and interconnected to the second portion of the RFID device.

9. The label of claim 1 wherein the base segments, the leg segments and the label segment are rectangular.

10. The label of claim 9 wherein the base segments and the leg segments are substantially the same size.

11. The label of claim 10 wherein the label segment is larger than either the base segments or the leg segments.

12. The label of claim 1, further including a planar sheet including a plurality of segments separated by perforations, the planar sheet being affixed to a release liner; the plurality of segments comprising:
   a first base segment having a bottom surface including an adhesive for affixing the first base segment to a surface of an object and having a top surface opposite the bottom surface;
   a second base segment, having a bottom surface including an adhesive for affixing the second base segment to the surface of the object and having a top surface opposite the bottom surface;
   a label segment including at least one of a radio frequency identification (RFID) device and indicia,
   a first leg segment; and
   a second leg segment; and
   wherein the plurality of segments are configured to be folded into at least a first three dimensional label in the configuration set forth in claim 1.

13. The label of claim 12 wherein the label segment comprises a top surface and a bottom surface and the bottom surface of the label segment faces the top surfaces of the first and second base segments.

14. The label of claim 13 wherein the label segment is comprised of two label sub-segments each having a bottom surface with an adhesive and a top surface, the two label-sub-segments being folded upon each other such that the bottom surfaces of the label sub-segments are adhered to each other to form the label segment, wherein the top surface of one of the label sub-segments forms the top surface of the label segment and the top surface of the other of the label sub-segments forms the bottom surface of the label segment.

15. The label of claim 14 wherein the label segment includes the portion of the RFID device disposed on one of the bottom surfaces of the label sub-segments and is sandwiched between the bottom surfaces of the label sub-segments when the two label-sub-segments are folded upon each other.

16. The label of claim 15 wherein the label segment includes the indicia and the indicia comprises one of a bar code label or other written information about the object.

17. The label of claim 15 wherein the first portion of the RFID device of the label segment constitutes the entire RFID device.

18. The label of claim 15 further including a second portion of the RFID device located on one of the first or second leg segment and interconnected to the first portion of the RFID device.

19. The label of claim 18 further including a third portion of the RFID device located on one of the first or second base segment and interconnected to the second portion of the RFID device.

20. The label of claim 12 wherein the base segments, the leg segments and the label segment are rectangular.

21. The label of claim 20 wherein the base segments and the leg segments are substantially the same size.

22. The label of claim 21 wherein the label segment is larger than either the base segments or the leg segments.

23. The label of claim 12 wherein the wherein the plurality of segments are configured to be alternatively folded into a second three dimensional label, wherein the second three dimensional label comprises only the label segment and wherein the label segment comprises two label sub-segments each having a bottom surface with an adhesive and a top surface, the two label sub-segments being folded upon each other such along a perforation such that the bottom surfaces of the label sub-segments are adhered to each other to form the label segment.

24. The label of claim 23 wherein the two label sub-segments being folded upon each other along the perforation such that the bottom surfaces of the label sub-segments are adhered to each other and at an end spaced from the perforation the bottom surfaces of the label sub-segments are adhered to an object.

25. The label of claim 23 wherein the label segment further comprises at least one aperture for accepting a tie to affix the label segment to an object.

* * * * *